(12) United States Patent
Meng et al.

(10) Patent No.: US 11,169,386 B2
(45) Date of Patent: Nov. 9, 2021

(54) BEAM FORMING WITH FOCUS LOCATION ADJUSTMENT

(71) Applicant: Coherent, Inc., Santa Clara, CA (US)

(72) Inventors: Lei Meng, Wilsonville, OR (US); Michele Wayne Winz, Woodburn, OR (US)

(73) Assignee: Coherent, Inc., Santa Clara, CA (US)

( * ) Notice: Subject to any disclaimer, the term of this patent is extended or adjusted under 35 U.S.C. 154(b) by 128 days.

(21) Appl. No.: 16/393,545

(22) Filed: Apr. 24, 2019

(65) Prior Publication Data

US 2020/0341286 A1    Oct. 29, 2020

(51) Int. Cl.
*G02B 27/09* (2006.01)
*G02B 27/16* (2006.01)

(52) U.S. Cl.
CPC ....... *G02B 27/0927* (2013.01); *G02B 27/095* (2013.01); *G02B 27/16* (2013.01)

(58) Field of Classification Search
CPC .. G02B 27/09; G02B 27/095; G02B 27/0927; G02B 27/0955; G02B 27/0911; G02B 27/16; G02B 27/1006; G02B 247/141; G02B 27/30; G02B 13/18; G02B 26/0875; G02B 26/08; G01N 15/1459; G01N 15/14; G01N 2015/1447; G01N 21/64; G01N 21/6428; G01N 21/6402; B23K 26/0648; B23K 26/0738
USPC .............. 359/619, 719, 650, 800; 372/29.01, 372/29.014
See application file for complete search history.

(56) References Cited

U.S. PATENT DOCUMENTS

| 6,043,843 A * | 3/2000 | Kelley ................... G02B 26/00 348/207.99 |
| 9,784,957 B2 | 10/2017 | Nackerud et al. |
| 9,971,159 B2 | 5/2018 | Hertwig et al. |
| 2010/0220315 A1 | 9/2010 | Morrell et al. |
| 2018/0017769 A1 | 1/2018 | Meng et al. |
| 2018/0329203 A1 | 11/2018 | Hargis et al. |

FOREIGN PATENT DOCUMENTS

EP        0877273 A2    11/1998

OTHER PUBLICATIONS

Kingslake et al., "Lens Design Fundamentals", Academic Press, Second Edition, 2010, pp. 183-185.

(Continued)

*Primary Examiner* — Jie Lei
(74) *Attorney, Agent, or Firm* — Morrison & Foerster LLP (57) ABSTRACT

An apparatus includes a beam source, beam forming optics, a first focusing lens having a focal length, a second focusing lens having a focal length similar to the focal length of the first lens, and a lens translator configured to move the second lens transversely relative to the beam forming optics and to the first lens, and thereby move the elongated focus transversely. In some embodiments, the beam forming optics are positioned between the beam source and the first focusing lens, the first focusing lens is positioned between the beam forming optics and the second focusing lens, and the beam forming optics, the first focusing lens, and the second focusing lens are arranged to receive a beam of laser radiation from the beam source and to form the beam into an elongated focus.

26 Claims, 11 Drawing Sheets

(56) References Cited

OTHER PUBLICATIONS

Malacara et al., "Handbook of Optical Design", Marcel Dekker Inc., Second Edition, 2004, 4 pages.
Winz et al., Unpublished U.S. Appl. No. 15/883,542, filed Jan. 30, 2018, titled "Achromatic Astigmatic Anamorphic Objective".
International Search Report and Written Opinion received for PCT Patent Application No. PCT/US2020/027064, dated Jul. 21, 2020, 16 pages.
Gibson et al., "Wide-Angle Decentered Lens Beam Steering for Infrared Countermeasures Applications", Opt. Eng. vol. 43, No. 10, Oct. 2004, pp. 2312-2321.
Tholl, Hans D. "Novel Laser Beam Steering Techniques", Proceedings of SPIE, vol. 6397, 2006, pp. 639708-1-639708-14.

\* cited by examiner

BEAM FORMING WITH FOCUS LOCATION ADJUSTMENT

TECHNICAL FIELD OF THE INVENTION

The present disclosure relates in general to projection lenses. In particular, disclosed herein are apparatuses and methods for reduced degradation of beam intensity profile when repositioning the beam's focus.

DISCUSSION OF BACKGROUND ART

A basic principle of flow cytometry is the passage of particles in a fluid-stream through a focused beam of laser-radiation. The particles, particularly biological cells, can be detected, identified, counted, and sorted. Cell components are fluorescently labelled and then illuminated by the laser-radiation. Scattered and emitted radiation can be measured to determine the quantity and types of cells present in a sample.

Several detectors are carefully placed around the point where the fluid-stream passes through the focused laser-beam. The suspended particles, which may range in size from 0.2 to 150 micrometers (µm), pass through the focused laser-beam and scatter the laser-radiation. The fluorescently-labelled cell components are also excited by the focused laser-beam and emit radiation (fluorescence) at a longer wavelength than that of the laser-beam. This combination of scattered and fluorescent radiation is measured by the detectors. Measurement data is then analyzed, using special software, by a computer that is attached to the flow cytometer. Thousands of particles per second can be measured and analyzed.

In flow cytometry (as in many applications), beam intensity profile at the laser focus significantly influences precision. Particles scatter radiation and emit radiation based on the intensity of the laser light at the focus; variations in intensity at the focal point can lead to variations in scattering and emission, which can cause erroneous measurements. If intensity varies, scattering and emission will vary, and thus detectors will fail to consistently identify the same particle type: a particle may or may not be detected depending on its position in the flow. In flow cytometry, the desired beam profile is a "flat-top," which can be understood to mean that an intensity of the beam is distributed substantially in a rectangle profile across a portion of the focal point. Tolerances are very small and leave little room for intensity variation.

Beam focus movement can cause degradation of beam intensity profile at the focus. Some applications require movement of the beam focus during use. Some systems are modular, which require beam focus movement during setup. For example, flow cytometry components (e.g., an optical apparatus, a detector, a fluidics system) are frequently sold separately and later assembled together. Flow cytometry modularity provides for more applications and more selection of parameters within an application. For example, laser beams having different wavelengths can be combined with different detector arrangements.

To facilitate the modular assembly, flow cytometry components are typically highly indexed, but adjustment after assembly is frequently necessary. In some cases, a focal point of the optical system must be adjusted to accommodate misalignment during assembly, for example, misalignment between an optical apparatus and a fluidic system. Focal point adjustment, however, can alter the beam intensity profile and thereby negatively impact effectiveness of the laser application.

SUMMARY OF THE INVENTION

Advantageously, the apparatuses and methods described herein can reposition a beam's focus with reduced degradation of beam intensity profile. In one aspect, an apparatus includes a beam source, beam forming optics, a first focusing lens having a focal length, a second focusing lens having a focal length similar to the focal length of the first lens, and a lens translator configured to move the second lens transversely relative to the beam forming optics and to the first lens, and thereby move the elongated focus transversely. In some embodiments, the beam forming optics are positioned between the beam source and the first focusing lens, the first focusing lens is positioned between the beam forming optics and the second focusing lens, and the beam forming optics, the first focusing lens, and the second focusing lens are arranged to receive a beam of laser radiation from the beam source and to form the beam into an elongated focus.

In one aspect, a method of translating a laser beam focus includes generating a beam of laser radiation, forming the beam using beam forming optics, focusing the formed beam using a first focusing lens and a second focusing lens (the first focusing lens positioned between the beam forming optics and the second focusing lens) into an elongated focus, and moving the elongated focus transversely by moving the second lens transversely relative to the beam forming optics and to the first lens.

BRIEF DESCRIPTION OF THE DRAWINGS

The accompanying drawings, which are incorporated in and constitute a part of the specification, schematically illustrate exemplary embodiments, and together with the general description given above and the detailed description of the embodiments given below, serve to explain principles of the present invention.

DETAILED DESCRIPTION OF THE INVENTION

Figure 1A:
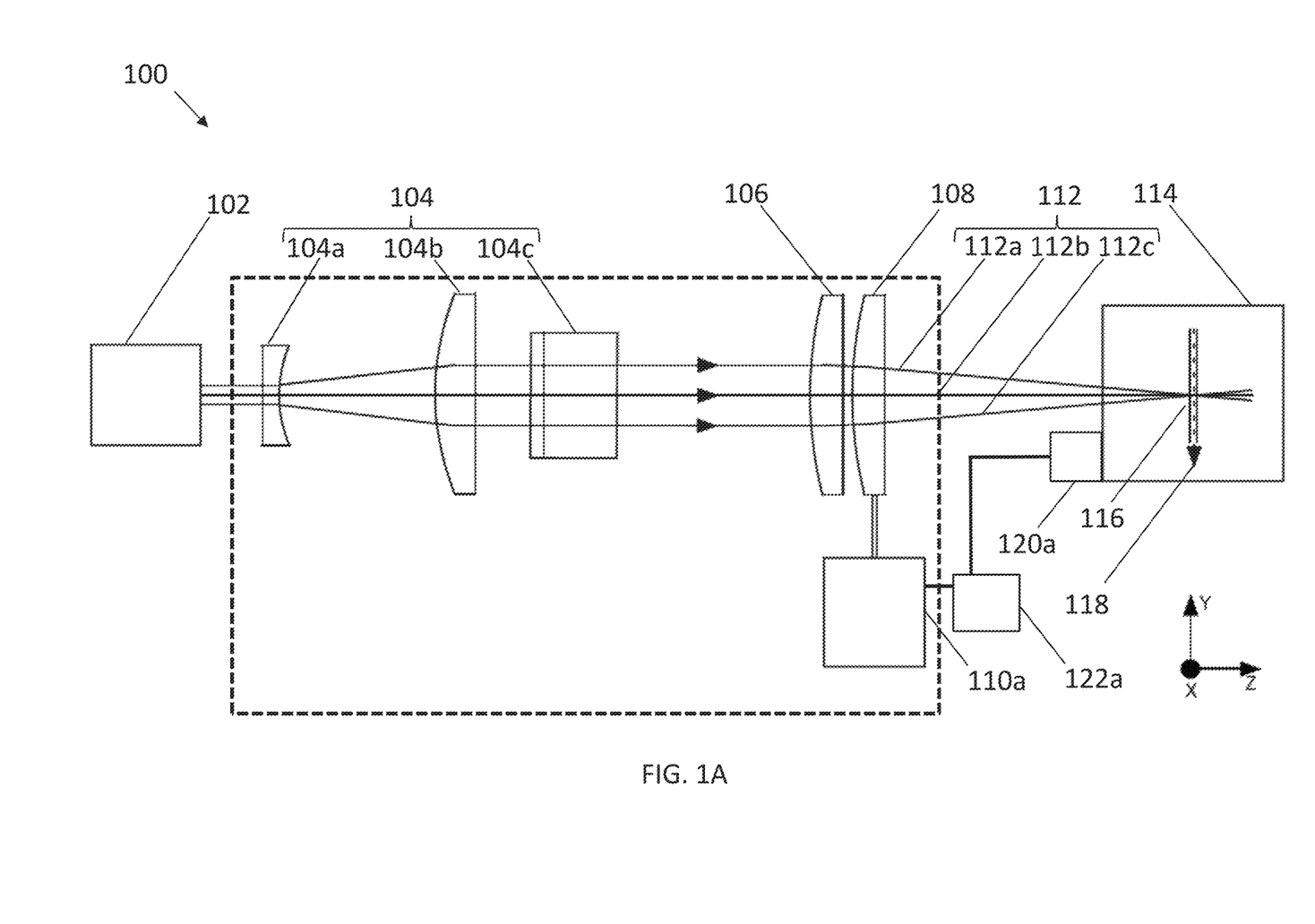
FIG. 1A is a side-view schematically illustrating an apparatus in accordance with an embodiment, the apparatus including a beam source, beam forming optics, a first focusing lens, a second focusing lens, a lens translator, and a flow cell.

Turning now to the drawings, wherein like features are designated by like reference numerals, FIG. 1A is a side-view schematically illustrating apparatus 100 for focusing a laser beam in accordance with an embodiment of the present invention. Apparatus 100 includes beam source 102 producing beam 112, beam forming optics 104, a first focusing lens 106, a second focusing lens 108, a lens translator 110a, and (optional) sensor 120a. Beam 112 is depicted by center ray 112b and peripheral rays 112a and 112c. Beam forming optics 104 are positioned between the beam source 102 and the first focusing lens 106, and first focusing lens 106 is positioned between beam forming optics 104 and second focusing lens 108.

The beam forming optics 104, the first focusing lens 106, and the second focusing lens 108 are arranged to receive the beam 112 of laser radiation from the beam source 102 and to form the beam 112 into an elongated focus 116. FIG. 1A depicts the short axis of the elongated focus.

As shown in the example of FIG. 1A, apparatus 100 provides illumination for a flow cytometry system with a fluid 118 flowing in a flow cell 114. As depicted in FIG. 1A, the fluid 118 drops through flow cell 114 due to gravity. Herein below, the orientation and arrangement of elements and beams in apparatus 100 will be discussed with reference to Cartesian axes X, Y, and Z, which are depicted on the drawing.

Flow cytometry is offered throughout this disclosure as an example application to illustrate features of the disclosure, but it will be understood that the disclosure is not limited to a particular application. The apparatuses and methods disclosed herein may be useful in other applications benefitting from low degradation of intensity profile when a focus is moved.

In some embodiments, beam source 102 provides a source of laser light for apparatus 100. When used for flow cytometry, beam source 102 may provide a plurality of beams of laser light having different wavelengths. Exemplary methods and apparatuses of focusing two or more laser-beams having different wavelengths into a common focal-spot are disclosed in U.S. patent application Ser. No. 15/883,542, incorporated by reference herein in its entirety for all purposes, and U.S. Patent Application Publication No. 2018/0017769, incorporated by reference herein in its entirety for all purposes.

Beam source 102 directs beam 112 onto beam forming optics 104. Exemplary methods and apparatuses for beam forming are disclosed in U.S. patent application Ser. No. 15/883,542, incorporated by reference herein in its entirety for all purposes, and U.S. Patent Application Publication No. 2018/0017769, incorporated by reference herein in its entirety for all purposes.

In some embodiments, beam source 102 produces a Gaussian beam. In plane YZ depicted in the drawing, a lens 104a expands and a lens 104b collimates the Gaussian beam. A Powell lens 104c intercepts the expanded collimated Gaussian beam and is oriented to have no focusing power in plane YZ. Beam forming optics 104 are exemplary. In some embodiments, the beam forming optics may include more or less than the three exemplary elements depicted in FIG. 1A-FIG. 2B. For example, the beam forming optics can consist of a single optical element.

In some embodiments, components of system 100 are modular. In some embodiments, beam source 102 and beam forming optics 104 are combined into a single unit and first focusing lens 106, second focusing lens 108, and lens translator 110a (and/or lens translator 110b, see below) are combined into another single unit. In some embodiments, beam forming optics 104, first focusing lens 106, second focusing lens 108, and lens translator 110a (and/or lens translator 110b, see below) may be a single module (as indicated by the dashed rectangle in FIG. 1A). Other modular components of a flow cytometry system can include a beam source (e.g., beam source 102), a flow cell (e.g., flow cell 114), a radiation measurement system (not shown), and a measurement processor (not shown). In some embodiments, the beam focusing optics (e.g., first focusing lens 106, second focusing lens 108, and lens translators 110a and/or 110b) are combined as a module. In embodiments with a sensor (e.g., sensor 120a), the sensor can be combined in the same or a different module as the lens translator.

First focusing lens 106 and second focusing lens 108 combine to provide a focusing assembly for beam 112. As used herein, a "focusing assembly" can be understood to refer to an optical system (e.g., lenses) for forming a beam into a focus for an application. For example, first focusing lens 106 and second focusing lens 108 together form beam 112 into a focus, located in a flow cell to illuminate particles flowing through a flow cytometer.

Figure 1B:
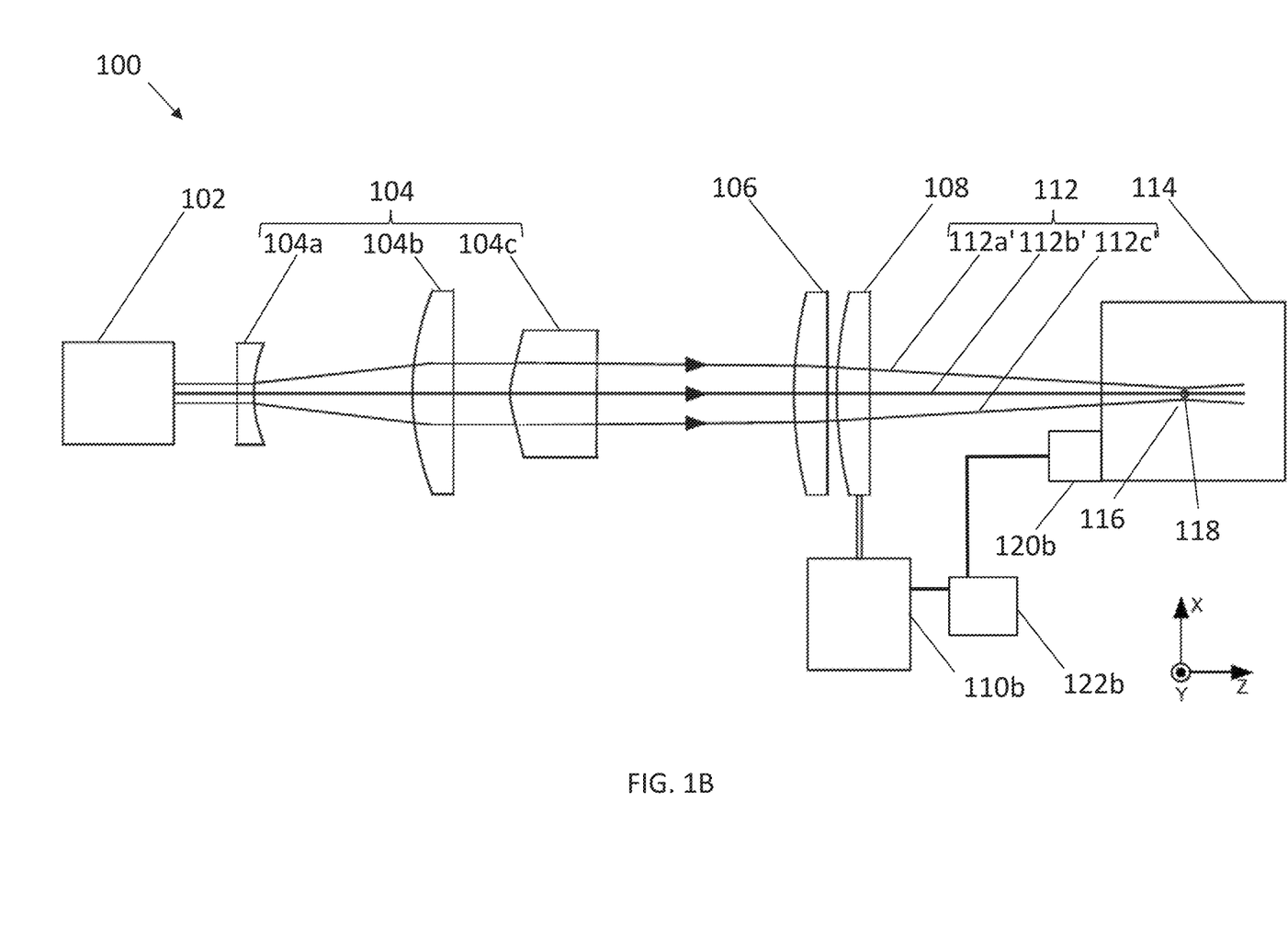
FIG. 1B is a plan-view schematically illustrating the apparatus of FIG. 1A.

FIG. 1B is a plan-view schematically illustrating the apparatus 100 of FIG. 1A. The drawing depicts the apparatus in the XZ plane. Peripheral rays 112a' and 112c' depicted in FIG. 1B are different from peripheral rays 112a and 112c in FIG. 1A. Center ray 112b is the same as center ray 112b'.

Except for Powell lens 104c, all optical elements look the same in the plan view because these elements are rotationally symmetric about the Z-axis. Other embodiments may include rotationally asymmetric elements, including aspheric surfaces and cylindrical surfaces, for example. Powell lens 104c transforms the expanded collimated Gaussian beam into a beam having an angularly-uniform intensity distribution. The focus 116 has a flat top intensity distribution along the X axis in the XY plane. Fluid 118 flowing in flow cell 114 is depicted as a circle located in about the middle of focus 116.

Overall, the beam forming and focusing optics produce a beam focus that is elongated along the X-axis. The flat-top intensity distribution along the X-axis in focus 116 is important for flow cytometry because a cell will consistently scatter and emit radiation, independent of the cells location in the flow as it transits through the focused beam. For reliable measurement, it is also important that the intensity distributions in the X-axis and Y-axis of the focus are invariant.

In some embodiments, the second focusing lens has a focal length similar to a focal length of the first focusing lens. As used herein, two lenses have a similar focal length when their focal lengths differ by less than 20%. The focal lengths more-preferably differ by less than 10% and most-preferably differ by less than 5%. First focusing lens 106 and second focusing lens 108 cooperatively have a focusing power equivalent to one stronger lens. The focal lengths of the first focusing lens $f_1$, the second focusing lens $f_2$, the distance between the first and second focusing lenses d, and an equivalent individual lens $f_3$ have the approximate relationship $$\frac{1}{f_3} = \frac{1}{2f_1} + \frac{1}{2f_2} - \frac{d}{f_1 f_2}.$$

When the focusing lenses have spherical figure, dividing the focusing power between two spatially-separated lenses will advantageously reduce spherical aberration in the focused beam. The two lenses are separated by a distance that is much less than their focal lengths $f_1$ and $f_2$; in some embodiments, less than 10% of $f_1$ and $f_2$, and more-preferably less than 5% of $f_1$ and $f_2$. In this condition, the third term in the relationship above is relatively small. Advantageously, two simple lenses having spherical figure may be less expensive than an optically equivalent aspheric lens.

Figure 2A:
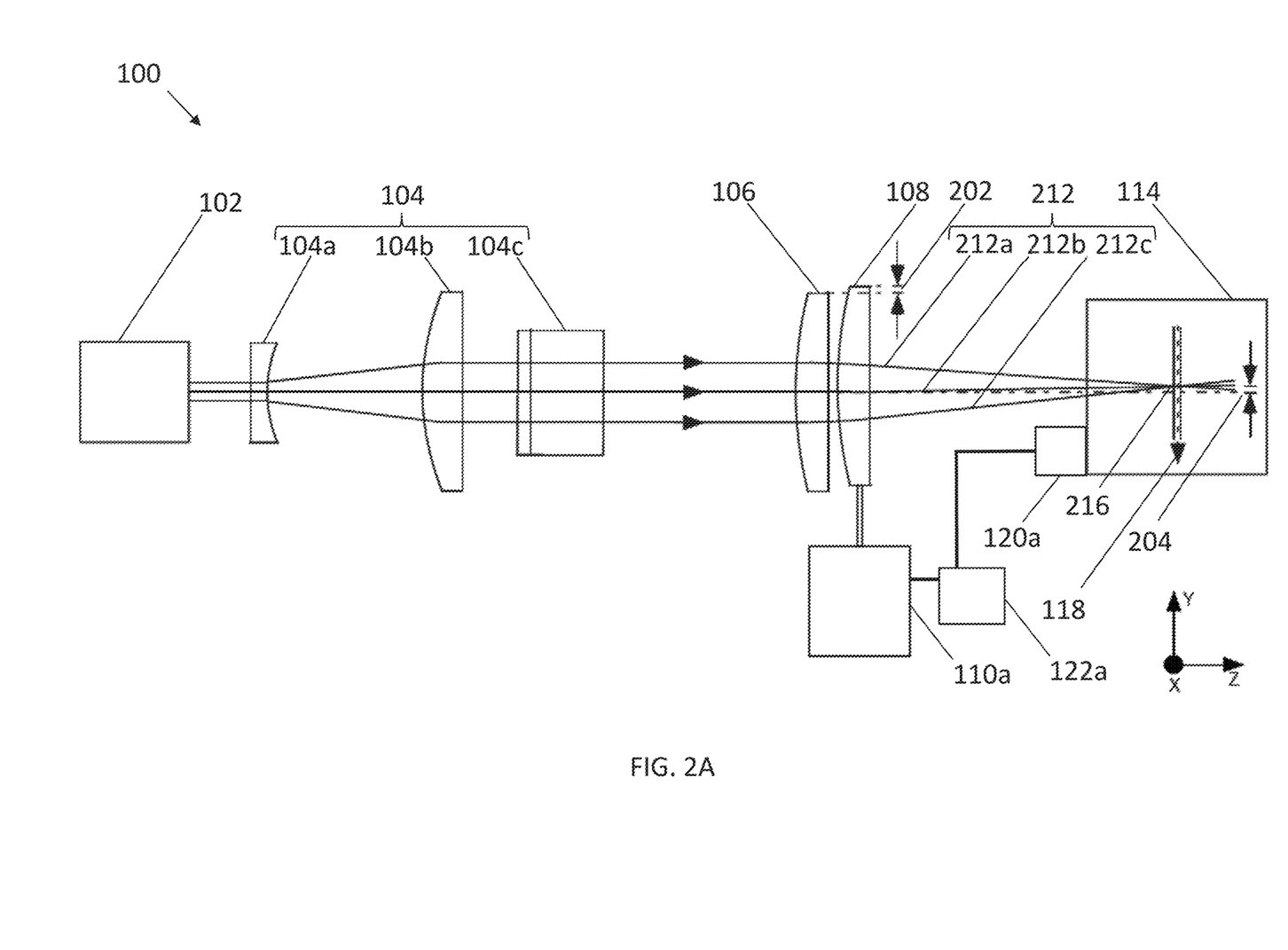
FIG. 2A is a side-view schematically illustrating the apparatus of FIG. 1A after the lens translator moved the second focusing lens transversely in a first direction relative to the beam forming optics and to the first lens, thereby moving the elongated focus transversely in the first direction.
Figure 2B:
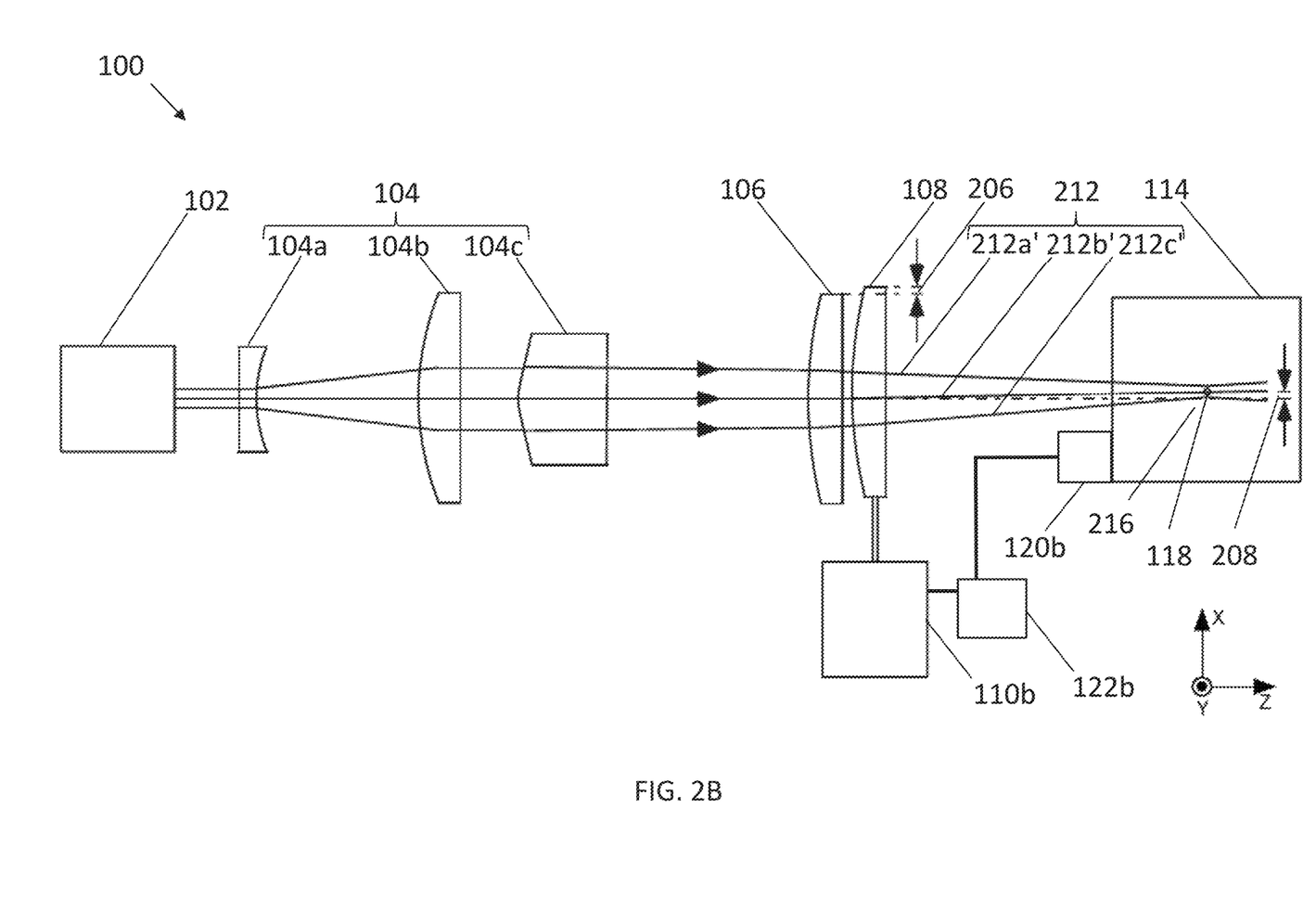
FIG. 2B is a plan-view schematically illustrating the apparatus of FIG. 1A after the lens translator moved the second focusing lens transversely in a second direction relative to the beam forming optics and to the first lens, thereby moving the elongated focus transversely in a second direction.

Each lens translator 110a and 110b is configured to translate second lens 108 transversely, in one of two axes relative to longitudinal direction of the beam 112. FIGS. 2A and 2B (discussed further below) illustrate the apparatus of FIGS. 1A and 1B after lens translator 110a and lens translator 110b, respectively, moved second lens 108 transversely relative to beam 112, thereby moving the elongated focus transversely in the corresponding direction. The displacement of the elongated focus is exaggerated in the drawings for convenience of illustration.

As used herein, the beam propagates in a "longitudinal direction", as referred to in the art. The center ray of the beam propagates approximately collinear with an "optical axis" of the system. A "transverse direction" is orthogonal to the longitudinal direction. Moving the second lens can be understood to mean moving the second lens while keeping the other optical elements substantially stationary. Moving second lens transversely does not preclude some incidental movement in the longitudinal direction. In general, pure transverse translation is preferred, but not required, to avoid displacing the elongated focus in the longitudinal direction.

In some embodiments, lens translators 110a and 110b are distinct translators and, in other embodiments, lens translators 110a and 110b represent portions of the same translator. For example, lens translator 110a and 110b may be portions of a lens translator that surrounds (partially or fully) second focusing lens 108. In some embodiments, one or both of the lens translators is a mechanical system that moves a lens in directions transverse to the direction of propagation. Mechanical systems for moving a lens, such as manual translation stages, motorized translation stages, piezo actuator, a servo motor, and linear actuators, are commercially available and a detailed description is not necessary for understanding the principles of the embodiments herein.

In some embodiments, lens translator 110a and/or lens translator 110b is operatively connected to controller 122a and/or controller 122b. Controller 122a and controller 122b may receive data from sensor 120a and/or sensor 120b, respectively, and translate second focusing lens 108 in accordance with an application parameter. In flow cytometry, for example, a sensor provides data on the position of the elongated focus relative to the flow of cells; the controller then sends signals to the lens translator(s) to align the elongated focus with the flow. In material processing applications, a sensor provides data on the position of processed material relative to an intended target; the controller then sends signals to the lens translator(s) to align the laser focus with the intended target. In some embodiments, sensors 120a and 120b are distinct sensors and, in other embodiments, sensors 120a and 120b are portions of the same sensor. In some embodiments, controllers 122a and 122b are distinct controllers and, in other embodiments, controllers 122a and 122b are portions of the same controller. In some embodiments, a controller is combined with the respective translator or sensor in a single unit.

FIG. 2A is a side-view schematically illustrating the apparatus of FIG. 1A after lens translator 110a moved the second focusing lens transversely in the Y direction relative to the beam forming optics and to the first lens, thereby moving the elongated focus transversely in the Y direction. In FIG. 2A, translator 110 has moved second focusing lens in the Y direction by distance 202 from its position in FIG. 1A. This results in a change of distance 204 in the focal position between FIGS. 1A and 2A. Such a change may be necessary when, for example, the optical axis of beam 112 does not initially align with flow cell 114, as depicted in FIG. 2A. This adjustment has particular utility when a flow cell assembly is integrated with detectors that are aligned during manufacture.

FIG. 2B is a plan-view schematically illustrating the apparatus of FIG. 1A after lens translator 110b moved the second focusing lens transversely in the X direction relative to the beam forming optics and to the first lens, thereby moving the elongated focus transversely in the X direction. In FIG. 2B, translator 110b has moved second focusing lens in the X direction by distance 206 from its position in FIG. 1B. This results in a change of distance 208 in the focal position between FIGS. 1B and 2B. Such a change may be necessary when, for example, the optical axis (depicted as a dashed line) of beam 112 does not initially align with flow cell 114, as depicted in FIG. 2B.

Figure 3A:
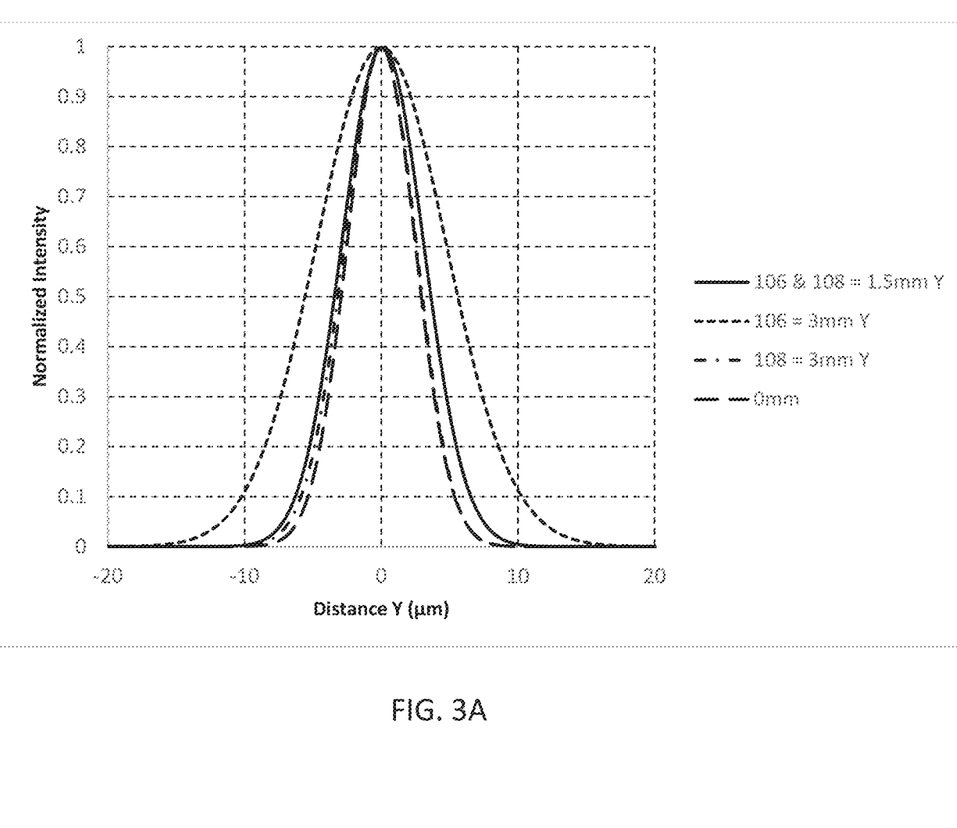
FIG. 3A is a graph of normalized intensity against vertical distance illustrating an effect of beam movement on a Gaussian beam intensity profile, in accordance with an embodiment. The graph provides normalized intensity before movement of a beam focus, after simultaneously moving a pair of focusing lenses 1.5 mm, after moving a first focusing lens 3.0 mm, and after moving a second focusing lens 3.0 mm.

FIG. 3A is a graph of normalized intensity against vertical distance illustrating an effect of beam movement on a Gaussian beam intensity profile at focus 116, in accordance with an embodiment. Individual intensity profiles are arranged on the graph with the center of each profile at a distance Y of 0 μm, for purposes of comparison. The graph (and the graphs in FIGS. 3B-4D) was generated using ZEMAX optical design software, available from Zemax LLC, of Kirkland, Wash.

The graph in FIG. 3A (and the graphs in FIGS. 3B-4D) were generated based on the apparatus depicted in FIGS. 1A-2B above (except where the graphs refer to a mirror system). The system included a beam 112 having a wavelength of 488 nm, a beam diameter (e.g., the diameter of the beam at source 102) of 0.7 mm, a focal length of −18 mm for a first beam forming optic (e.g., beam forming optic 104a), a focal length of 36 mm for a second beam forming optic (e.g., beam forming optic 104b), a Powell lens (e.g., Powell lens 104c) having a fan angle of 179.5 degrees, a focal length of 50 mm for a first focusing lens (e.g., lens 106) and an identical second focusing lens (e.g., lens 108).

The graph provides normalized intensity before movement ("0 mm") of a beam focus, after simultaneously moving a pair of focusing lens 1.5 mm ("106 & 108=1.5 mm Y"), after moving only a first focusing lens 3.0 mm ("106=3 mm Y"), and after moving only a second focusing lens 3.0 mm ("108=3 mm Y"). A displacement of 0 mm means the optical axes of both focusing lenses are aligned with the optical axis of the expanded collimated beam. Plot "108=3.0 mm Y" may correspond to the movement of second focusing lens 108 by distance 206 in FIG. 2A and corresponding movement of the focal position by distance 208.

The graph provides an intensity profile before movement of a beam focus (0 mm plot line) and provides exemplary intensity profiles corresponding to different mechanisms for moving the beam focus by 1.5 mm. Unexpectedly, the intensity profiles of moving the second focusing lens 106 (plot "106=3.0 mm Y") differs from the plot of moving both lenses together. Note that the first focusing lens and second focusing lens were individually moved 3.0 mm to move the focal point 1.5 mm because the two lenses each have half the focusing power of the two lens combined. The inventors discovered that movement of the first focusing lens relative to the optical axis provides more degradation of the intensity profile than moving both lenses together. More importantly, the inventors discovered that movement of the second lens transversely relative to the beam forming optics and to the first lens resulted in less degradation of the intensity profile.

Figure 3B:
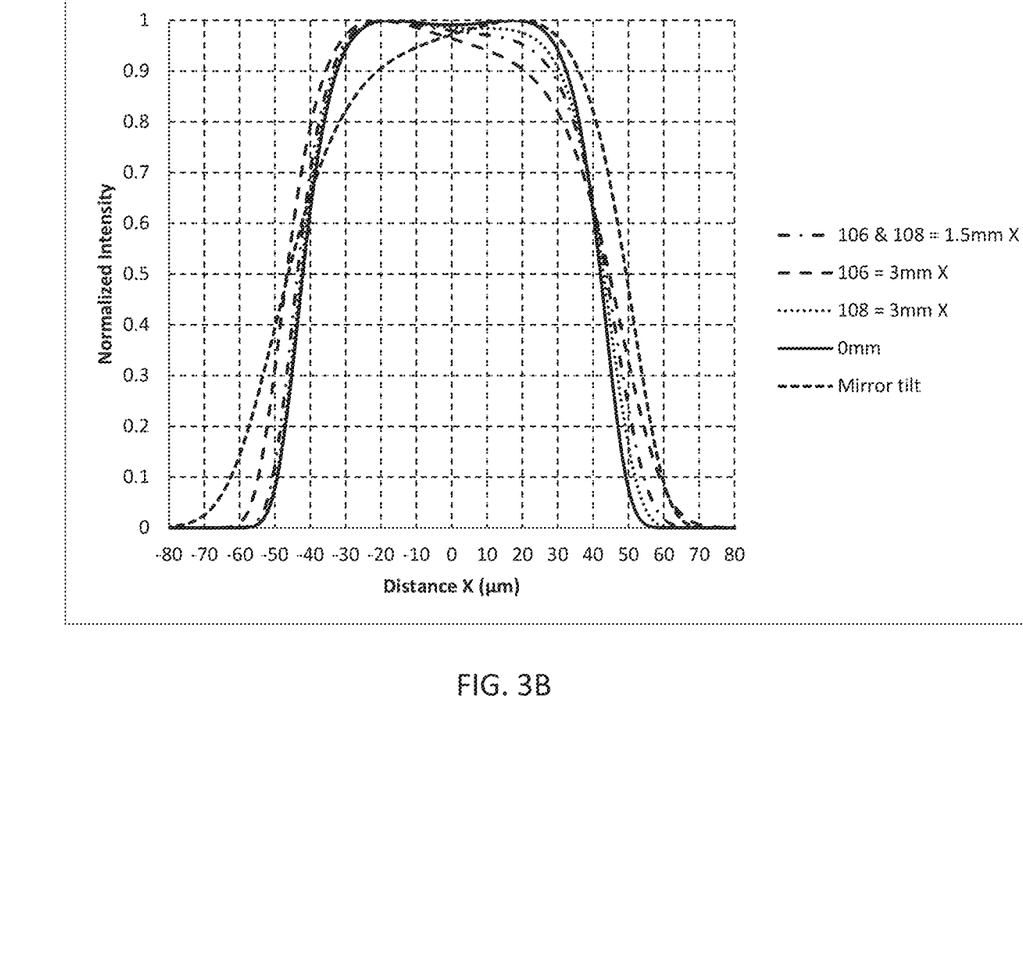
FIG. 3B is a graph of normalized intensity against horizontal distance on a flat-top intensity profile, in accordance with an embodiment. The graph provides an intensity profile before movement of a beam focus and provides exemplary intensity profiles corresponding to different mechanisms for moving the beam focus.

The effect of lens movement on a flat-top profile is more striking. FIG. 3B is a graph of normalized intensity against horizontal distance after moving one or both of focusing lenses 106 and 108 in the X-direction by the displacements indicated. The 0 mm plot depicts a flat-top profile with the optical axes of both focusing lenses aligned with the optical axis of the expanded collimated beam transformed by Powell lens 104c. The remaining plots illustrate the effect on the flat-top profile after a beam's focus spot is moved 1.5 mm. The plot for focus displacement using a tilted mirror (see below) shows a flat-top profile that is significantly distorted and widely spread in the horizontal direction relative to the 0 mm plot. The plot for "106 & 108=1.5 mm X" represents movement of two lenses together. The movement of the two lenses together shows a significant improvement of the flat-top profile relative to the tilted mirror plot, but still shows degradation from the 0 mm plot.

Figure 4A:
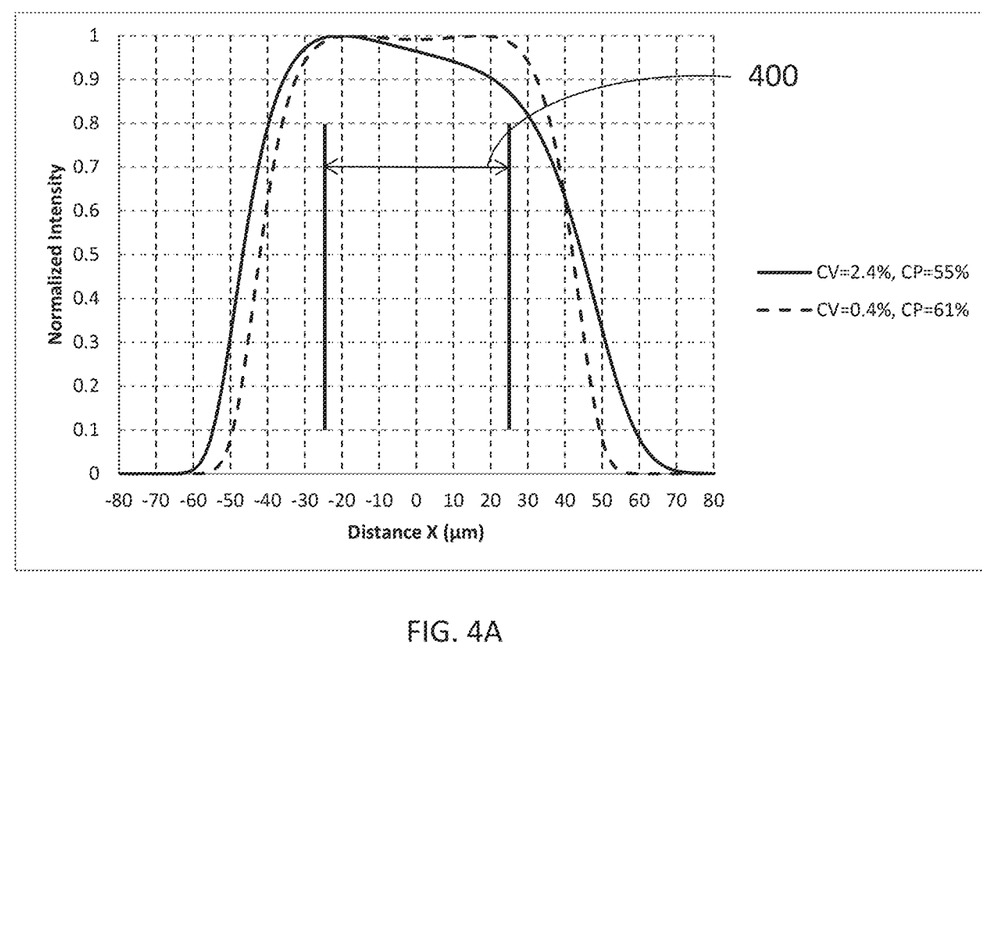
FIG. 4A is a graph of normalized intensity against horizontal distance illustrating exemplary flat-top beam intensity profiles for beams of different coefficients of variance ("CV") and contained power ("CP"), in accordance with an embodiment.

As with the intensity profile in FIG. 3A, the flat-top profiles of moving only the first focusing lens 106 (plot "106=3.0 mm X") and only second focusing lens 108 (plot "108=3.0 mm X") differ manifestly from the plot of moving both lenses together. By moving only the second focusing lens 108, the inventors discovered that the beam's flat-top profile undergoes less change from the 0 mm plot than for moving both lenses together. This discovery may be particularly advantageous in applications benefitting from low degradation of intensity profile when a focus is moved. For example, moving the second lens only may allow a flow cytometry cell to consistently scatter and emit radiation, independent of the cells location in the flow as it transits through the focused beam FIG. 4A is a graph of normalized intensity against distance illustrating exemplary flat-top intensity profiles for a beam having ideal coaxial alignment along the optical axis and another alignment where lens 106 is displaced from the optical axis by 3.0 mm in the X direction.

CV can be understood from the following equation $$\text{Coefficient of Variation } (CV) = \frac{\text{Standard deivation of Intensity}}{\text{Mean Intensity}} \quad (1)$$

CV value is indicative of the "flatness" of a flat-top intensity distribution in a desired window. A 50 µm window 400 is indicated in FIG. 4A. In flow cytometer use, a CV of less than 3% (more-preferably less than 2%) may be acceptable. Advantageously, embodiments herein can maintain a CV of less than 3% (and, in some cases, less than 2%) after moving a focal point. Some embodiments described herein can maintain a CV of between 0.2% and 3% (more preferably between 0.2% and 2%) after moving a focal point.

CP can be understood from the following equation $$\text{Contained Power } (CP) = \frac{\text{Power in specified window}}{\text{Total power}} \quad (2)$$

CP value is indicative of the power in a desired window. In flow cytometer use, a CP greater than 50% (more-preferably greater than 60%) may be acceptable. Advantageously, embodiments herein can maintain a CP of greater than 50% (and in some cases, greater than 60%) after moving a focal point. Some embodiments described herein can maintain a CP of between 50% and 80% after moving a focal point (more preferably between 60% and 80%).

Herein, all the CV and CP values are for a roving 50 µm window. Essentially, the center of the 50 µm window is scanned across the intensity distribution, with the minimum CV and maximum CP values provided. For the exemplary 50 µm window in FIG. 4A, two exemplary intensity profiles illustrate the correlation of flat-top profile to CV and CP. A beam with CV of 0.4% provides a flat-top profile that is close to horizontal at the top of the profile, relative to a beam with CV of 2.4%. A beam with CP 61% concentrates more power within the 50 µm window 400 relative to a beam with 55% CP.

Figure 4B:
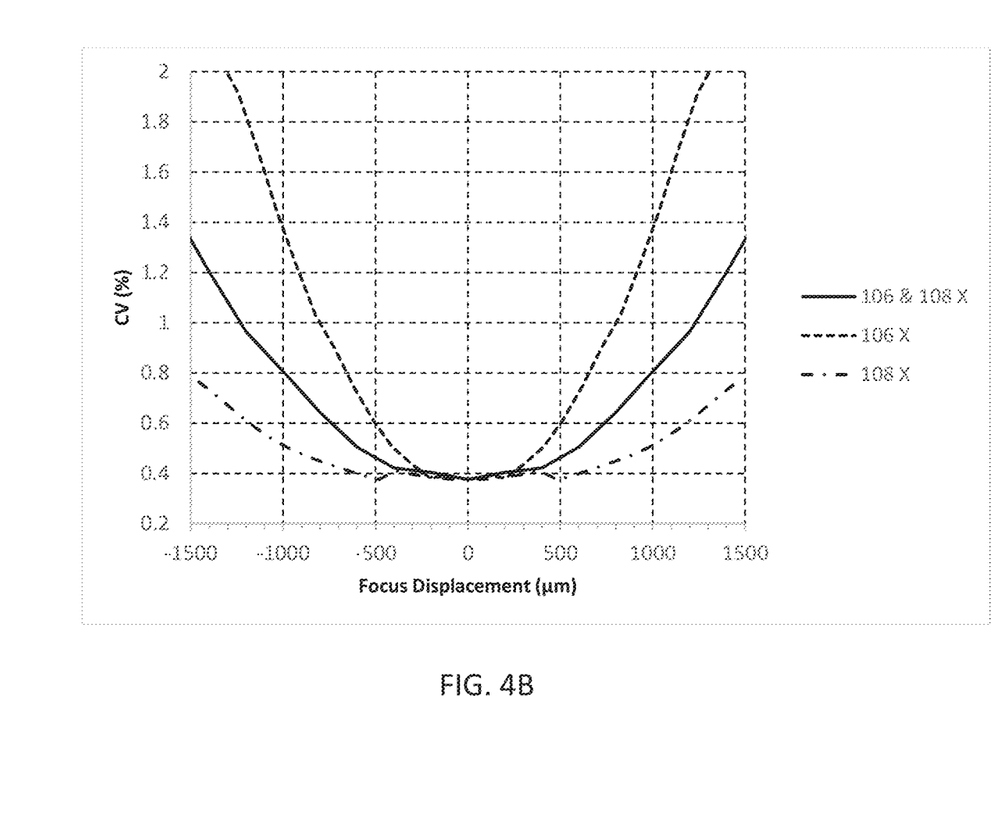
FIG. 4B is a graph of CV against horizontal focus displacement, in accordance with an embodiment. The graph provides CV for focus displacements corresponding to moving a pair of focusing lens together, moving a first focusing lens, and moving a second focusing lens.

FIG. 4B is a graph of CV against horizontal focus displacement, in accordance with an embodiment. The graph provides CV for focus displacements corresponding to moving a pair of focusing lens together ("106 & 108 X"), moving only a first focusing lens ("106 X"), and moving only a second focusing lens ("108 X"). The graph shows unexpected improvements in CV by moving the second lens transversely relative to the beam forming optics and to the first lens. As shown in FIG. 4B, the improvement can be found regardless of the distance the focal spot moves. "Focus displacement" in the graph of FIG. 4B may correspond to movement in the X-direction shown in FIGS. 1B and 2B described above.

Figure 4C:
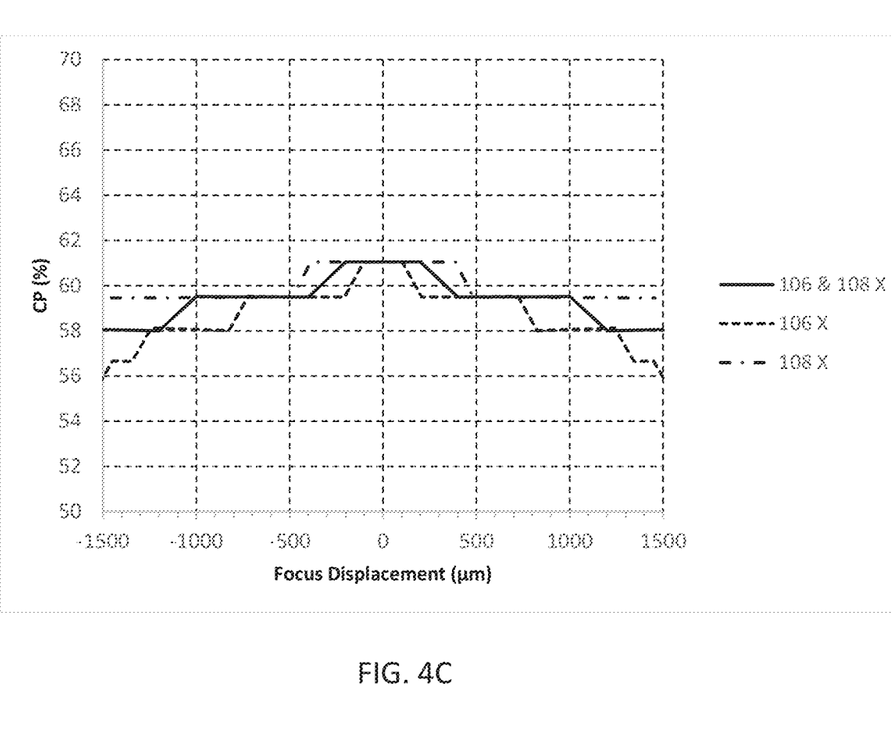
FIG. 4C is a graph of CP against horizontal focus displacement, in accordance with an embodiment. The graph provides CP for focus displacements corresponding to moving a pair of focusing lens together, moving a first focusing lens, and moving a second focusing lens.

FIG. 4C is a graph of CP against horizontal focus displacement, in accordance with an embodiment. The graph provides CP for focus displacements corresponding to moving a pair of focusing lens together ("106 & 108 X"), moving only a first focusing lens ("106 X"), and moving only a second focusing lens ("108 X"). The graph shows unexpected improvements in CP by moving the second lens transversely relative to the beam forming optics and to the first lens. As shown in FIG. 4C, the improvement can be found regardless of the distance the focal spot moves. "Focus displacement" in the graph of FIG. 4C may correspond to movement in the X-direction shown in FIGS. 1B and 2B described above.

Figure 4D:
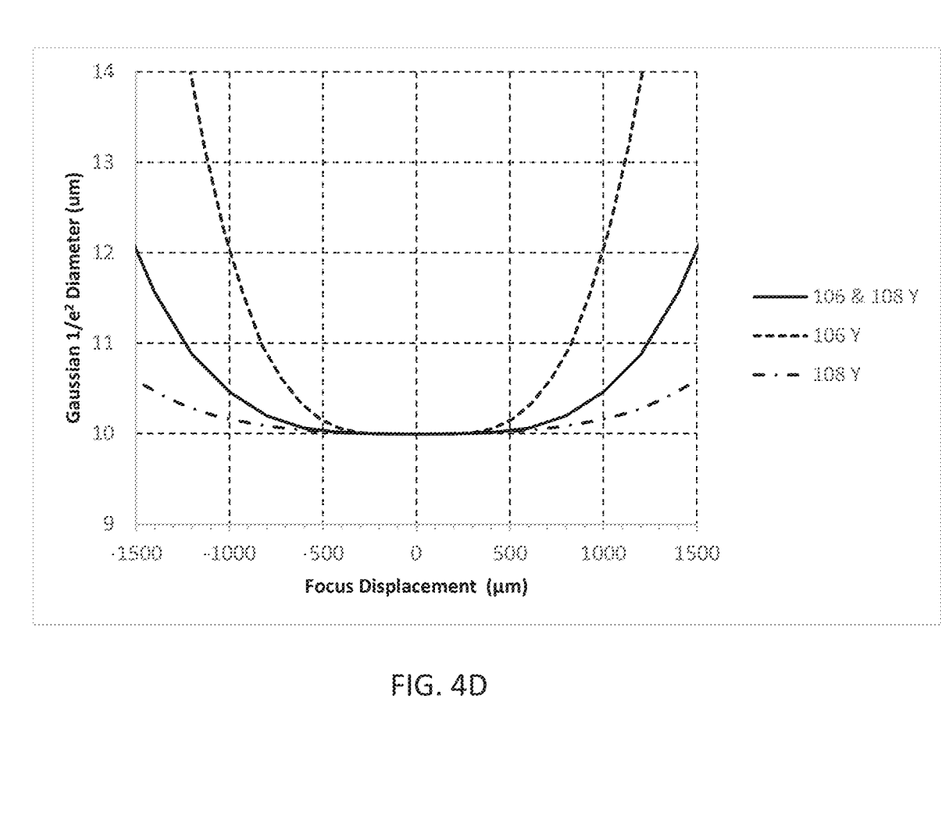
FIG. 4D is a graph of vertical Gaussian beam width against focus displacement, in accordance with an embodiment. The graph provides vertical Gaussian beam width for focus displacements corresponding to moving a pair of focusing lens together, moving a first focusing lens, and moving a second focusing lens.

FIG. 4D is a graph of vertical Gaussian beam width against vertical focus displacement, in accordance with an embodiment. The graph provides vertical Gaussian beam width for focus displacements corresponding to moving a pair of focusing lens together ("106 & 108 Y"), moving only a first focusing lens ("106 Y"), and moving only a second focusing lens ("108 Y"). The plots illustrate that moving the second lens transversely relative to the beam forming optics and to the first lens provides the least degradation of the beam compared to the 0 mm plot. "Focus displacement" in the graph of FIG. 4D may correspond to movement in the Y-direction shown in FIGS. 1A and 2A described above.

Figure 5:
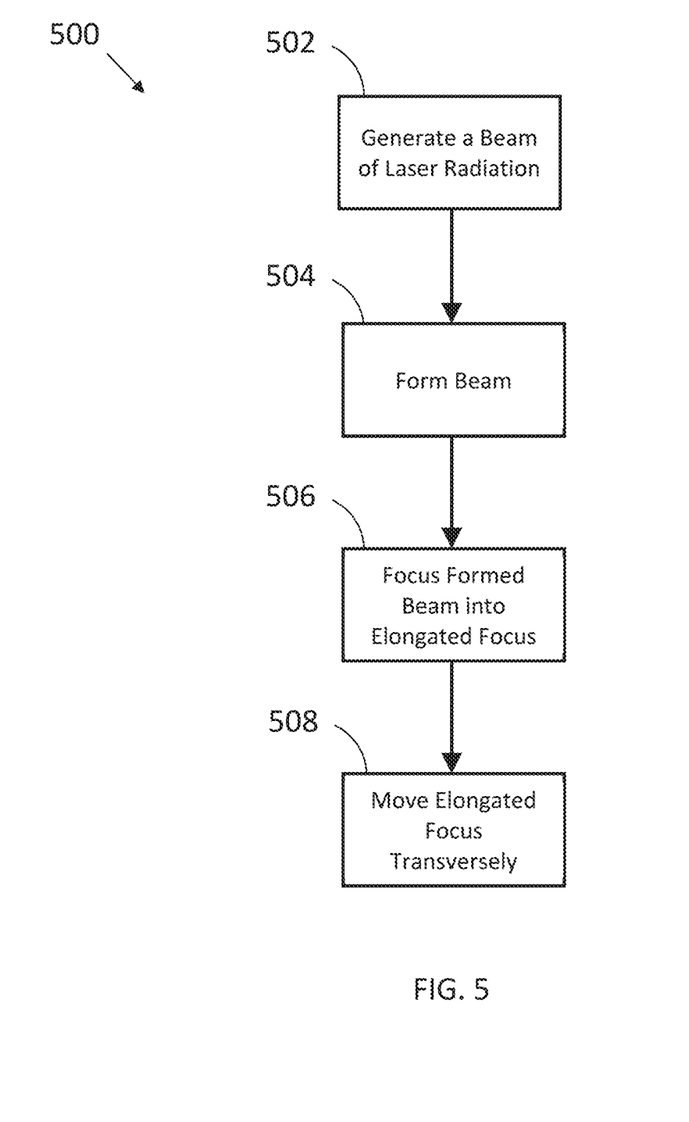
FIG. 5 is a method of translating a beam focus, in accordance with an embodiment.

FIG. 5 is a method 500 of translating a beam focus in accordance with an embodiment. Method 500 includes generating a beam of laser radiation 502, forming the beam using beam forming optics 504, focusing the formed beam into an elongated focus using a first focusing lens and a second focusing lens 506, and moving the elongated focus transversely by moving the second lens transversely relative to the beam forming optics and to the first lens 508. In some embodiments, method 500 is performed by apparatus 100 described above.

In some embodiments of method 500, the elongated beam includes a flat-top intensity profile. In some embodiments of method 500, the second lens is made of a high refractive index glass, to further minimize spherical aberration. In some embodiments of method 500, the method further comprises providing additional focusing elements.

In some embodiments of method 500, generating a beam includes generating a Gaussian beam and the method further includes forming, at the beam forming optics, an angularly uniform beam from the Gaussian beam, and forming a spatially uniform beam in an illumination plane by focusing the angularly uniform beam. As used herein, a spatially uniform beam can be understood to be a beam with a flat-top intensity profile at the beam's focus, as described further herein.

In some embodiments of method 500, the method further includes illuminating a flow cell with the elongated-focus beam. In some embodiments, the method further includes measuring radiation scattered and emitted from the flow cell.

In some embodiments of method 500, the method further includes receiving data on the position of the elongated focus and sending, based on the data, command signals to the lens translator to move the second lens transversely.

In some embodiments of method 500, the first focusing lens and second focusing lens are separated. In some embodiments, the first focusing lens and second focusing lens are separated by a distance less than 10% of the first focusing lens' focal length. In some embodiments, the first focusing lens and second focusing lens are separated by a distance less than 5% of the first focusing lens' focal length.

In some embodiments of method 500, the focal lengths of the first and second focusing lenses differ by less than 20%. In some embodiments, the focal lengths of the first and second focusing lenses differ by less than 5%.

In some embodiments of method 500, the beam source and the beam forming optics are integrated into a single unit, and the first focusing lens, the second focusing lens, and the lens translator are integrated into another single unit. In some embodiments, the beam forming optics, the first focusing lens, the second focusing lens, and the lens translator are integrated into a single unit.

In some embodiments of method 500, moving the elongated focus transversely includes maintaining a coefficient of variation between 0.2-3.0% after moving the elongated focus transversely. In some embodiments of method 500, moving the elongated focus transversely includes maintaining a contained power between 50-80% after moving the elongated focus transversely.

Returning to FIGS. 1A-2B, in some embodiments, the focus assembly includes additional focusing elements, such as a third lens, where the second lens is positioned between the first lens and the third lens and the third lens has a focal length longer than the focal length of the first or second lens. For example, a focal length at least five times longer than the first or second lens. A translatable third lens having much weaker optical power than first lens X and second lens Y would provide additional finer transverse adjustment of the focus position.

Returning to FIG. 3B, the intensity profile "mirror tilt" is generated for apparatus 100 having an additional folding mirror located between the beam forming optics and the focusing optics. To move focus 116, the folding mirror could be tilted, which changes the location and angle of incidence of the expanded collimated beam on focusing lenses 106 and 108. The comparison in the drawing shows that tilting the folding mirror causes considerably more distortion of the intensity profile than moving the focus by translating just second focusing lens 108. Also, such tilting would introduce chromatic aberrations in a beam having multiple wavelengths, further distorting the beam.

The present invention is described above with reference to preferred embodiments. The invention, however, is not limited to the embodiments described and depicted herein. Rather the invention is limited only by the claims appended hereto. The use herein of "including," "comprising," "having," "containing," "involving," and variations thereof is meant to encompass the items listed thereafter and equivalents thereof as well as additional items and do not preclude the presence or addition of one or more other features, integers, processes, operations, elements, components, and/or groups thereof. As used herein, the singular forms "a", "an," and "the" are intended to include the plural forms as well, unless the context clearly indicates otherwise.

What is claimed is:

1. An apparatus comprising:
a beam source configured to generate a laser beam;
beam forming optics including a Powell lens configured to transform the laser beam in a first transverse dimension orthogonal to a propagation direction of the laser beam;
first and second focusing lenses arranged to focus the laser beam, after transformation by the Powell lens, into a focus that is elongated in the first transverse dimension as compared to a second transverse dimension, the second transverse dimension being orthogonal to each of the first transverse dimension and the propagation direction,
wherein
respective focal lengths of the first and second focusing lenses differ by less than 20%, and
the first focusing lens is positioned between the beam forming optics and the second focusing lens; and
a lens translator configured to move the focus transversely to the propagation direction by translating the second focusing lens transversely to the propagation direction and relative to the first focusing lens.

2. The apparatus of claim 1, wherein the laser beam has a flat-top intensity distribution in the first transverse dimension at the focus.

3. The apparatus of claim 1, further comprising a third lens having a focal length longer than the focal length of the second focusing lens, and wherein the second focusing lens is positioned between the first focusing lens and the third lens.

4. The apparatus of claim 1, wherein the beam forming optics are arranged to convert a Gaussian beam, provided by the beam source, into an angularly uniform beam.

5. The apparatus of claim 1, further comprising a flow cell illuminated by the laser beam.

6. The apparatus of claim 5, further comprising a radiation measurement system configured to measure radiation scattered and emitted from the flow cell.

7. The apparatus of claim 1, further comprising:
a sensor configured to provide data on the position of the elongated focus; and
a controller configured to receive data from the sensor and send command signals to the lens translator to move the second focusing lens transversely.

8. The apparatus of claim 1, wherein the first and second focusing lenses are separated by a distance that is less than 10% of each of their focal lengths.

9. The apparatus of claim 8, wherein the first and second focusing lenses are separated by a distance that is less than 5% of the first lens' focal length.

10. The apparatus of claim 1, wherein the beam source and the beam forming optics are integrated into a single unit, and wherein the first focusing lens, the second focusing lens, and the lens translator are integrated into another single unit.

11. The apparatus of claim 1, wherein the beam forming optics, the first focusing lens, the second focusing lens, and the lens translator are integrated into a single unit.

12. The apparatus of claim 1, wherein the focal lengths of the first and second focusing lenses differ by less than 5%.

13. The apparatus of claim 1, wherein the first and second focusing lenses are configured to maintain a flat-top intensity distribution of the beam at the focus when translating the second focusing lens to move the focus transversely in the first transverse dimension, the flat-top intensity distribution being characterized by a coefficient of variation between 0.2 and 3.0% within a 50-micrometer roving window in the first transverse dimension.

14. The apparatus of claim 1, wherein the first and second focusing lenses are configured to maintain a contained power within a 50-micrometer roving window in the first transverse dimension when translating the second focusing lens to move the focus transversely in the first transverse dimension, the contained power being between 50 and 80% of the total power of the laser beam.

15. The apparatus of claim 1, wherein the lens translator is configured to move the second focusing lens transversely to the propagation direction.

16. A method of translating a laser beam focus, the method comprising:
generating a laser beam;
forming, using beam forming optics, the laser beam, wherein forming the laser beam includes using a Powell lens to transform the laser beam in a first transverse dimension orthogonal to a propagation direction of the laser beam;
focusing, using a first and a second focusing lens, the formed laser beam into a focus that is elongated in the first transverse dimension as compared to a second transverse dimension, the second transverse dimension being orthogonal to each of the first transverse dimension and the propagation direction, wherein the first focusing lens is positioned between the beam forming optics and the second focusing lens; and
moving the elongated focus transversely to the propagation direction by translating the second focusing lens transversely to the propagation direction and relative to the first focusing lens.

17. The method of claim 16, wherein the laser beam has a flat-top intensity distribution in the first transverse dimension at the focus.

18. The method of claim 16, further comprising providing a third lens, wherein the focusing second lens is positioned between the first focusing lens and the third lens, and wherein the third lens has a focal length longer than the focal length of the second focusing lens.

19. The method of claim 16, wherein generating a laser beam includes generating a Gaussian beam, the method further comprising:
forming, at the beam forming optics, an angularly uniform beam from the Gaussian beam; and
forming a spatially uniform beam in a plane from the angularly uniform beam by focusing the angularly uniform beam.

20. The method of claim 16, further comprising illuminating a flow cell with the elongated-focus laser beam.

21. The method of claim 20, further comprising measuring radiation scattered and emitted from the flow cell.

22. The method of claim 16, further comprising:
receiving data on the position of the elongated focus; and
sending, based on the data, command signals to the lens translator to move the second focusing lens transversely.

23. The method of claim 16, wherein the first focusing lens and second focusing lens are separated.

24. The method of claim 16, wherein the beam source and the beam forming optics are integrated into a single unit, and wherein the first focusing lens, the second focusing lens, and the lens translator are integrated into another single unit.

25. The method of claim 16, wherein the beam forming optics, the first focusing lens, the second focusing lens, and the lens translator are integrated into a single unit.

26. A method of translating a laser beam focus in a flow cell using an apparatus, the apparatus comprising:
a beam source configured to generate a laser beam;
beam forming optics including a Powell lens configured to transform the laser beam in a first transverse dimension orthogonal to a propagation direction of the laser beam;
first and second focusing lenses arranged to focus the laser beam, after transformation by the Powell lens, into a focus that is elongated in the first transverse dimension as compared to a second transverse dimension, the second transverse dimension being orthogonal to each of the first transverse dimension and the propagation direction,
wherein
the respective focal lengths of the first and second focusing lenses differ by less than 20%,
the first focusing lens is positioned between the beam forming optics and the second focusing lens, and
the beam forming optics, the first focusing lens, and the second focusing lens are arranged to receive the laser beam from the beam source and to form the laser beam into the elongated focus in the flow cell,
wherein the method comprises:
moving the elongated focus transversely in the flow cell by moving the second focusing lens transversely to the propagation direction and relative to the first focusing lens.

* * * * *